UNITED STATES PATENT OFFICE.

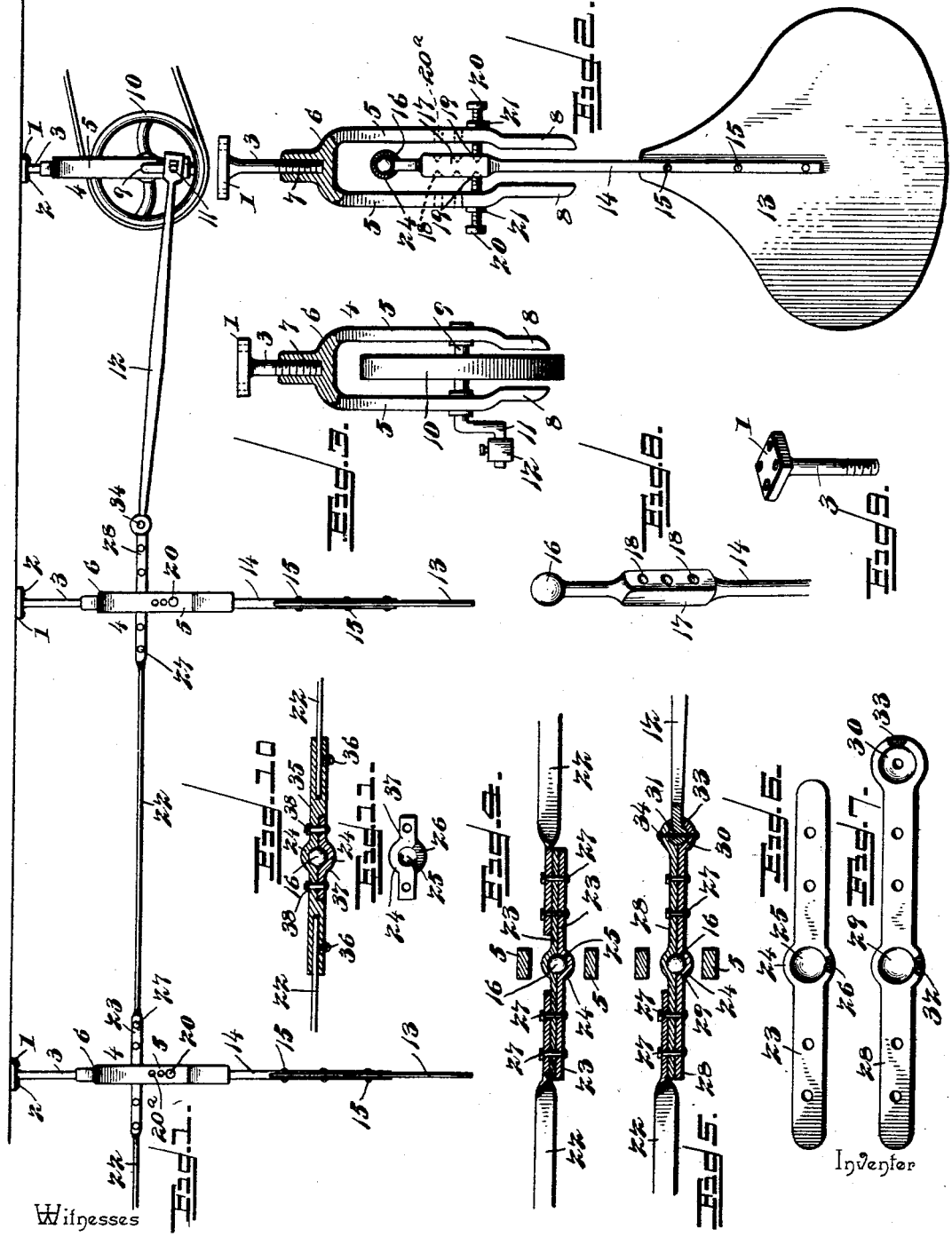

EUGENE S. DUNN, OF MARIETTA, OHIO.

SYSTEM OF FANS.

SPECIFICATION forming part of Letters Patent No. 591,959, dated October 19, 1897.

Application filed March 18, 1897. Serial No. 628,205. (No model.)

*To all whom it may concern:*

Be it known that I, EUGENE S. DUNN, a citizen of the United States, residing at Marietta, in the county of Washington and State of Ohio, have invented a new and useful System of Fans, of which the following is a specification.

This invention relates to systems of fans, its object being to improve and simplify the construction of the supporting and operating mechanism, whereby friction of the working parts will be reduced, and the several parts of the apparatus may be readily disassociated for the purpose of removal and repair. With these and other ends in view the invention consists in the several details of construction and combinations of parts hereinafter fully described, and particularly pointed out in the claims.

In the drawings, Figure 1 is a side elevation showing the manner of attaching the fans to the ceiling. Fig. 2 is an end view of one of the fans and its supporting and operating devices. Fig. 3 is a similar view of the driving-pulley. Figs. 4 and 5 are horizontal sections through the couplings. Figs. 6, 7, 8, and 9 are views of detached details. Figs. 10 and 11 are views of a modification.

Similar reference-numerals indicate similar parts in the several figures.

The ceiling-plates are indicated by 1, and 2 indicates the screws or other fastening devices, by means of which the plates are secured to the ceiling. Each plate is provided with a stem 3, extending downwardly therefrom, the lower end of the stem being threaded. These stems may be of any desired length. The hangers are indicated by 4, and each hanger consists of two depending arms 5, connected at their upper ends by a crown-piece 6, which is provided with a threaded socket 7, by means of which the hangers are screwed onto the stems 3 of the ceiling-plates. The lower ends of the arms 5 are preferably bent inwardly toward each other, as indicated at 8. The hangers for the fans and for the belt-pulley, by means of which the fans are operated, will be similar to each other, but the stem 3, to which the pulley-hanger is attached, will be shorter than the stems to which the fan-hangers are attached, as will be referred to more particularly hereinafter.

The arms 5 of the pulley-hanger are provided with openings to form bearings for the shaft 9, on which the pulley 10 is rigidly mounted. The shaft 9 is provided at one end, outside the arm 5, with a crank 11, to which one end of the connection-rod 12 is attached. The pulley 10 will be driven from any suitable source of power—such as a water, electric, or spring motor. (Not shown.)

13 represents the fans, each of which is secured to a handle 14, the lower portion of the handle being split in order that the fan 13 may be inserted between the split portions, and the fan is firmly held in position by means of rivets or other suitable fastening devices, (indicated by 15.) The upper end of the handle is ball-shaped, as indicated at 16, and between this end and the fan the handle is thickened or enlarged, as indicated at 17. This thickened or enlarged part 17 is provided on opposite sides with a series of conical recesses 18, into which the pointed or conical ends 19 of set-screws 20 enter. These set-screws work in openings $20^a$ in the arms 5 of the hangers and form the pivot-points on which the fan is rocked. Each set-screw is provided with a jam-nut 21, which, when screwed up against the arms 6, will lock the set-screws in position. It will be seen that by having the series of conical recesses 18 in the handle 14 and a corresponding series of openings $20^a$ in the arms of the hangers for the set-screws 20 the pivotal point of the fan-handle may be varied to increase or decrease the length of stroke of the fan, as may be desired.

22 represents the pitman, which is made up of a series of sections which may be of any desired length to accommodate the distance between the adjacent fans. In the drawings I have indicated these pitman-sections as being formed of metal, but it is to be understood that they may be of wood, if preferred, and that they may be of any desired form or size. The couplings between the pitman-sections and the fan-handles consist of two plates 23, each provided about midway of its length with an expanded portion 24, in which is formed a semispherical recess 25 to receive the ball 16 on the end of the fan-handle. The metal of the expanded portion 24 is cut away, as indicated at 26, to afford a passage for the handle 14 and allow it to have a limited amount of play therein. The plates 23 are bolted together by a series of bolts 27, and the ends of the pitman-sections are also bolted to the plates 23 by the same bolts.

The coupling between the connecting-rod 12 and the fan nearest to the pulley 10 consists of two plates 28, each of which is expanded at its central portion and also at one end, and these expanded portions are each provided with a semispherical recess, (indicated by 29 and 30, respectively, the recess 29 being intended to fit over the ball 16 of the fan-handle, and the recess 30 being intended to receive a ball 31 on the end of the connecting-rod 12.) The plates 28 are bolted together and to the first section of the pitman 22 by bolts 27. The expanded portions of these plates are also provided with recesses 32 and 33 to afford passages for the fan-handle and connecting-rod, respectively, and to allow a limited amount of play therein. To prevent any possibility of the ball 31 pulling out of its socket, a pin 34 extends transversely through the plates 28 and the ball 31, but this pin does not in any manner interfere with the free working of the ball-and-socket connection between the coupling and the connecting-rod 12.

In Figs. 10 and 11 I have shown a modified form of coupling for the pitman-sections and the fan-handles. In this case I use a round or square bar 35, having longitudinal bores at each end to receive the ends of the sections of the pitman which are held in position by set-screws 36. The middle portion of the bar is cut away to form a recess to receive the plate 37, which is secured thereto by bolts 38. The plate 37 and the bar are each provided with an expanded portion 24 and a semispherical recess 25 to receive the ball 16 on the end of the fan-handle, and both are cut away at 26 for the passage of the fan-handle, in a manner similar to the coupling previously described.

In setting up the apparatus the hanger for the pulley will be so arranged that the pulley-shaft 9 will be substantially in the same horizontal plane as the balls 16 on the ends of the fan-handles, and in order to do this it will be necessary to have the stem 3, to which the pulley-hanger is attached, shorter than the stems to which the fan-hangers are attached, as before mentioned.

From the foregoing description it will be seen that the several parts of the fan operating and supporting devices may be readily disassociated for the purpose of removal or repair, and also that there is very little friction between the working parts. It will, therefore, require very little power to operate these fans, and the only points that will require lubricating will be the ends of the pivot-pins 20 and the ball-and-socket connections between the fan-handles, the pitman, and the connecting-rod.

The fans may be of any desired material that will have the necessary strength and rigidity, and the opposite faces of the fans may be used for advertising purposes, if desired, and it is to be understood that changes in the form, proportion, and minor details of construction may be resorted to without departing from the spirit or sacrificing any of the advantages of this invention.

Having thus described my invention, what I claim is—

1. In a fan system, the combination of a series of fans each having a handle provided with a ball-shaped upper end and with a series of recesses in opposite sides thereof between the ball-shaped end and the fan, a series of hangers suspended from the ceiling and provided with oppositely-arranged set-screws to engage the recesses in the fan-handle, a pitman having a series of sockets to receive the ball-shaped ends of the fan-handles, and means to reciprocate the pitman, substantially as described.

2. In a fan system, the combination of a series of hangers, a series of fans the handles of which are pivoted in said hangers, each handle having a ball-shaped upper end, a pitman formed of a series of sections, couplings connecting the said sections together and to the fan-handles, each coupling consisting of two plates each provided with a semispherical recess to receive the ball-shaped end of the fan-handle, and means to reciprocate the pitman, substantially as described.

3. In a fan system, the combination of a ceiling-plate, a threaded stem extending therefrom, a hanger consisting of spaced arms united at their upper ends by a crown-piece having a threaded socket to receive said threaded stem, a fan-handle having a series of conical recesses in opposite sides, set-screws working in said arms and having conical ends to engage the conical recesses in the handle, jam-nuts on the set-screws adapted to engage the arms and lock the screws in position, and means connected to the upper end of the fan-handle to rock the latter on the set-screws, substantially as described.

In testimony that I claim the foregoing as my own I have hereto affixed my signature in the presence of two witnesses.

EUGENE S. DUNN.

Witnesses:
   J. S. SPRAGUE,
   FRANK DEVOE.